US010886763B1

(12) United States Patent
Ha

(10) Patent No.: US 10,886,763 B1

(45) Date of Patent: Jan. 5, 2021

(54) CHARGING DEVICE

(71) Applicant: LG ELECTRONICS INC., Seoul (KR)

(72) Inventor: Sangdoo Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/800,165

(22) Filed: Feb. 25, 2020

(30) Foreign Application Priority Data

Dec. 10, 2019 (KR) ........................ 10-2019-0163457

(51) Int. Cl.

*H02J 7/00* (2006.01)
*A47L 5/24* (2006.01)
*A47L 9/28* (2006.01)

(52) U.S. Cl.

CPC .............. *H02J 7/0044* (2013.01); *A47L 5/24* (2013.01); *A47L 9/2857* (2013.01); *A47L 9/2873* (2013.01); *A47L 9/2884* (2013.01); *A47L 9/2894* (2013.01); *A47L 2201/022* (2013.01)

(58) Field of Classification Search

CPC combination set(s) only.
See application file for complete search history.

(56) References Cited

U.S. PATENT DOCUMENTS

| | | | | |
|---|---|---|---|---|
| 7,227,327 B2 * | 6/2007 | Im | G05D 1/0225 | 318/568.12 |
| 7,412,748 B2 * | 8/2008 | Lee | A47L 5/225 | 15/319 |
| 7,779,504 B2 * | 8/2010 | Lee | A47L 9/106 | 15/319 |
| 7,837,958 B2 * | 11/2010 | Crapser | A61L 9/122 | 422/291 |
| 8,380,350 B2 * | 2/2013 | Ozick | A47L 11/4027 | 700/253 |
| 8,606,401 B2 * | 12/2013 | Ozick | A47L 9/0477 | 700/253 |
| 8,635,739 B2 * | 1/2014 | Lee | A47L 9/20 | 15/319 |

(Continued)

FOREIGN PATENT DOCUMENTS

| | | |
|---|---|---|
| EP | 1 806 085 | 7/2007 |
| KR | 10-0657736 | 12/2006 |

(Continued)

OTHER PUBLICATIONS

International Search Report dated Aug. 26, 2020 issued in International Application No. PCT/KR2020/001136.

*Primary Examiner* — Lisa Lea-Edmonds

(74) *Attorney, Agent, or Firm* — Ked & Associates, LLP

(57) ABSTRACT

Provided is a charging device for charging a wireless manual cleaner and a robot cleaner. The charging device includes a first charger comprising a first charging terminal connected to a charging terminal of the manual cleaner, and a first transceiver configured to transmit and receive information to and from the manual cleaner; a second charger comprising a second charging terminal connected to a charging terminal of the robot cleaner, and a second transceiver configured to transmit and receive information to and from the robot cleaner; and a communication line configured to electrically connect the first transceiver and the second transceiver to each other.

20 Claims, 15 Drawing Sheets

(56) References Cited

U.S. PATENT DOCUMENTS

| | | | | |
|---|---|---|---|---|
| 9,144,360 | B2 * | 9/2015 | Ozick | B25J 9/1694 |
| 9,149,170 | B2 * | 10/2015 | Ozick | A47L 11/4013 |
| 9,223,749 | B2 * | 12/2015 | Chiappetta | G06F 17/00 |
| 9,606,541 | B2 * | 3/2017 | Abramson | A47L 9/2894 |
| 9,717,388 | B2 * | 8/2017 | Jeong | A47L 11/28 |
| 2007/0157415 | A1 * | 7/2007 | Lee | A47L 9/2884 15/319 |
| 2007/0157416 | A1 * | 7/2007 | Lee | A47L 9/2894 15/319 |
| 2007/0157420 | A1 * | 7/2007 | Lee | A47L 5/28 15/328 |
| 2009/0049640 | A1 * | 2/2009 | Lee | A47L 9/20 15/319 |
| 2012/0060320 | A1 * | 3/2012 | Lee | A47L 9/20 15/347 |
| 2013/0335900 | A1 * | 12/2013 | Jang | H02J 7/0044 361/679.01 |
| 2017/0332857 | A1 * | 11/2017 | Nam | A47L 9/1691 |
| 2020/0225673 | A1 * | 7/2020 | Ebrahimi Afrouzi | B25J 9/1697 |

FOREIGN PATENT DOCUMENTS

| | | |
|---|---|---|
| KR | 10-0758038 | 9/2007 |
| KR | 10-2012-0069043 | 6/2012 |
| KR | 10-1192540 | 10/2012 |
| KR | 10-2016-0129525 | 11/2016 |
| KR | 10-2018-0015928 | 2/2018 |

* cited by examiner

CHARGING DEVICE

CROSS-REFERENCE TO RELATED APPLICATION

This application claims priority under 35 U.S.C. § 119 to Korean Application No. 10-2019-0163457 filed on Dec. 10, 2019, whose entire disclosure is hereby incorporated by reference.

BACKGROUND

1. Field

The present discloser relates to a charging device. More particularly, the present discloser relates to a charging device for charging a wirelessly operating robot cleaner and a handy cleaner.

2. Background

Generally, a robot cleaner is charged by a charging device, and then performs cleaning while moving wirelessly. Such a robot cleaner cleans a set region while itself avoiding an obstruction by a set function, or cleans the set region while moving along the set region in response to a received cleaning signal.

Further, a handy cleaner is configured to be grippable, and performs cleaning by a user's manipulation while being gripped by the user after being charged by the charging device. Since the robot cleaner cannot optionally clean a desired place, each home is furnished with the handy cleaner as well as the robot cleaner. The robot cleaner and the handy cleaner are charged as respective charging terminals thereof are connected to charging terminals of the charging device. The handy cleaner may be classified into a wired handy cleaner and a wireless handy cleaner.

Referring to FIG. 1, Korean Patent Publication No. 10-1192540 discloses a charging device 1 to which a wireless handy cleaner 3 and a robot cleaner 2 are connected. The charging device 1 may receive charging power via a single electric wire to simultaneously charge the wireless handy cleaner 3 and the robot cleaner 2.

Referring to FIG. 2, Korean Patent Publication No. 10-0657736 discloses a technique wherein a robot cleaner 2 is connected to a charging device 5 disposed on a wired handy cleaner 4. The wired handy cleaner 4 and the robot cleaner 2 connected to the charging device 5 may be simultaneously charged by charging power inputted via a single electric wire. However, the conventional charging devices 1 and 5 are problematic in that they are used only for the purpose of providing a charging function to the handy cleaners 3 and 4, and the robot cleaner 2.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
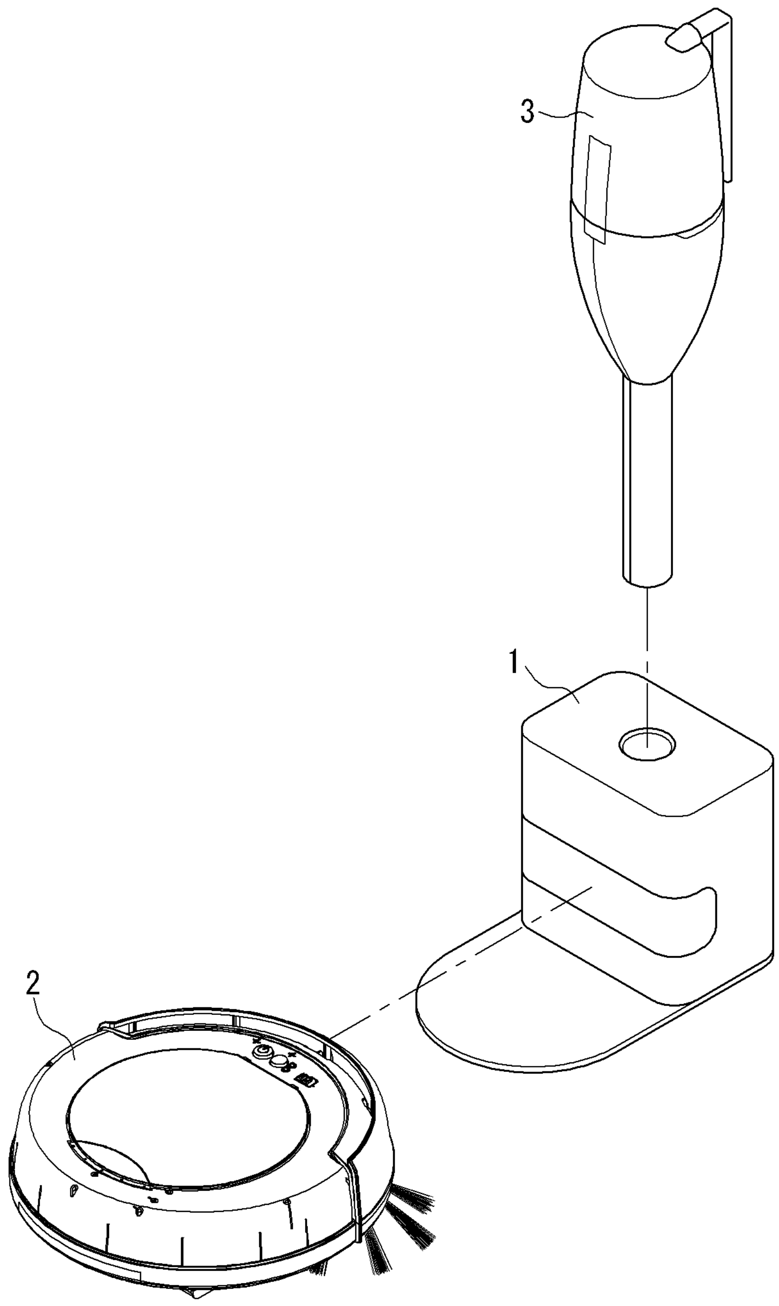
FIGS. 1 and 2 are perspective views of conventional charging systems.
Figure 2:
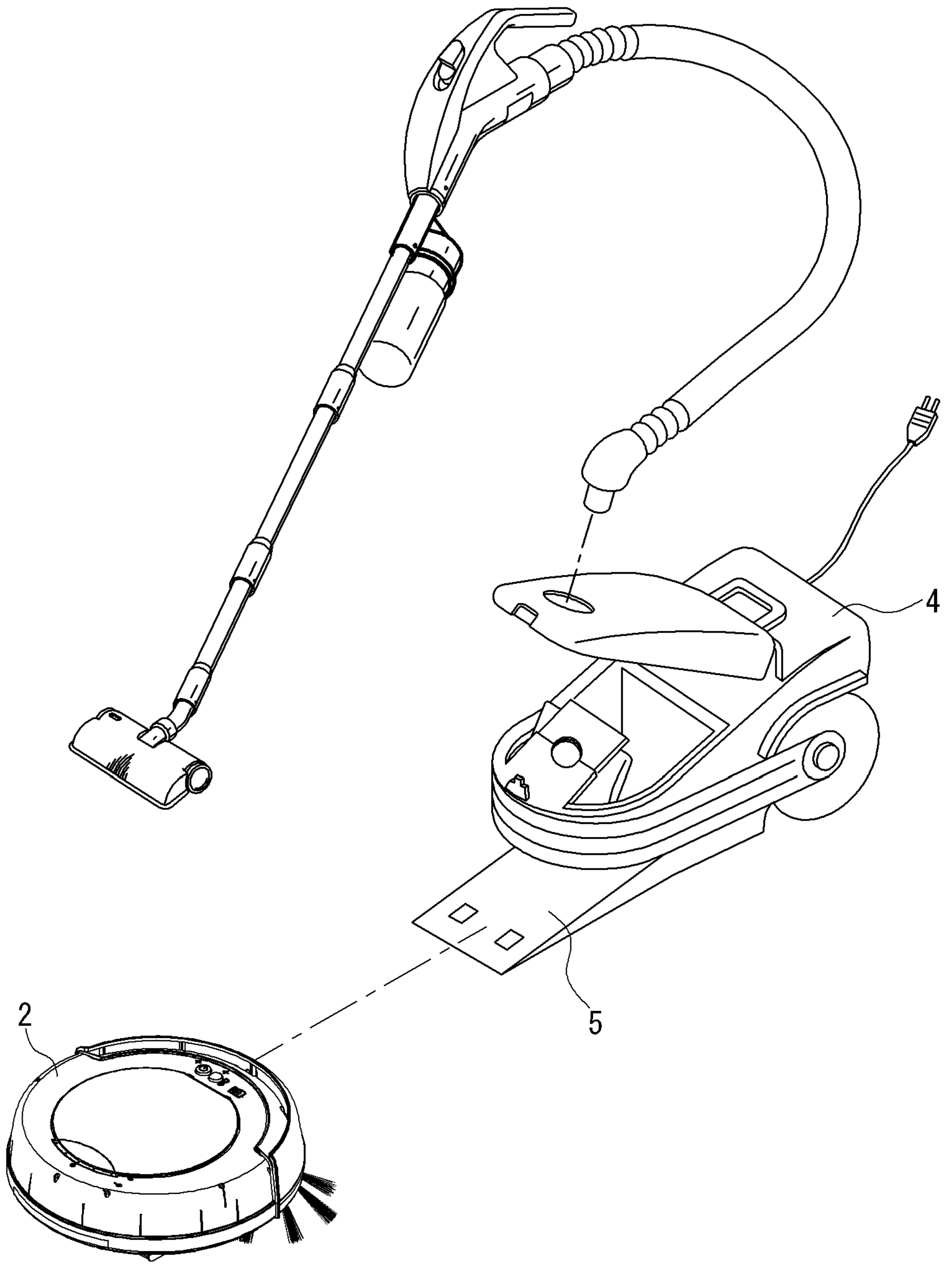
Figure 3:
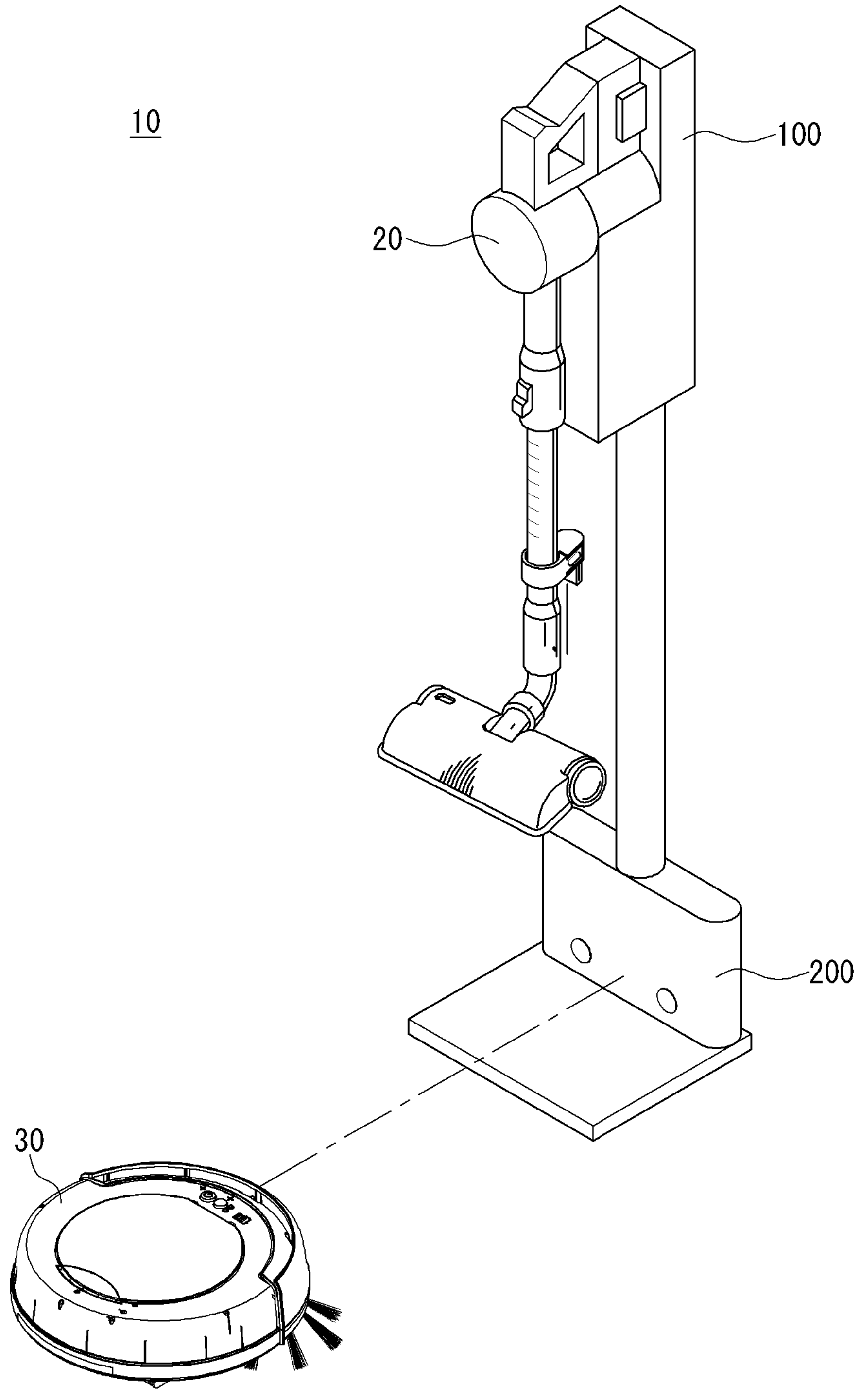
FIG. 3 is a perspective view of a charging system according to an embodiment of the present discloser.
Figure 4:
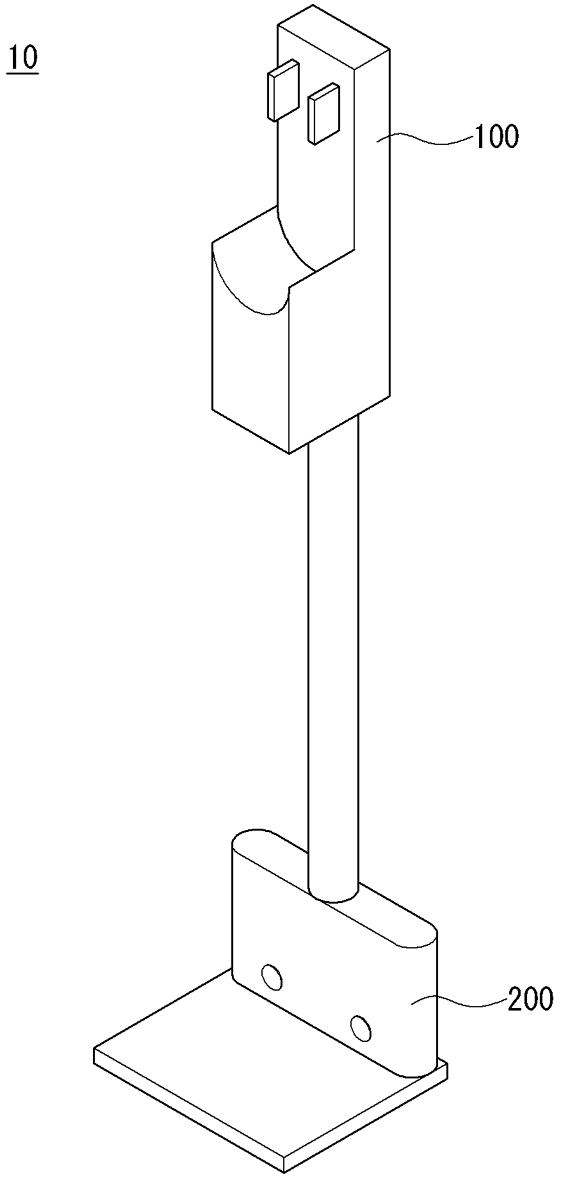
FIG. 4 is a perspective view of a charging device according to an embodiment of the present discloser.
Figure 9:
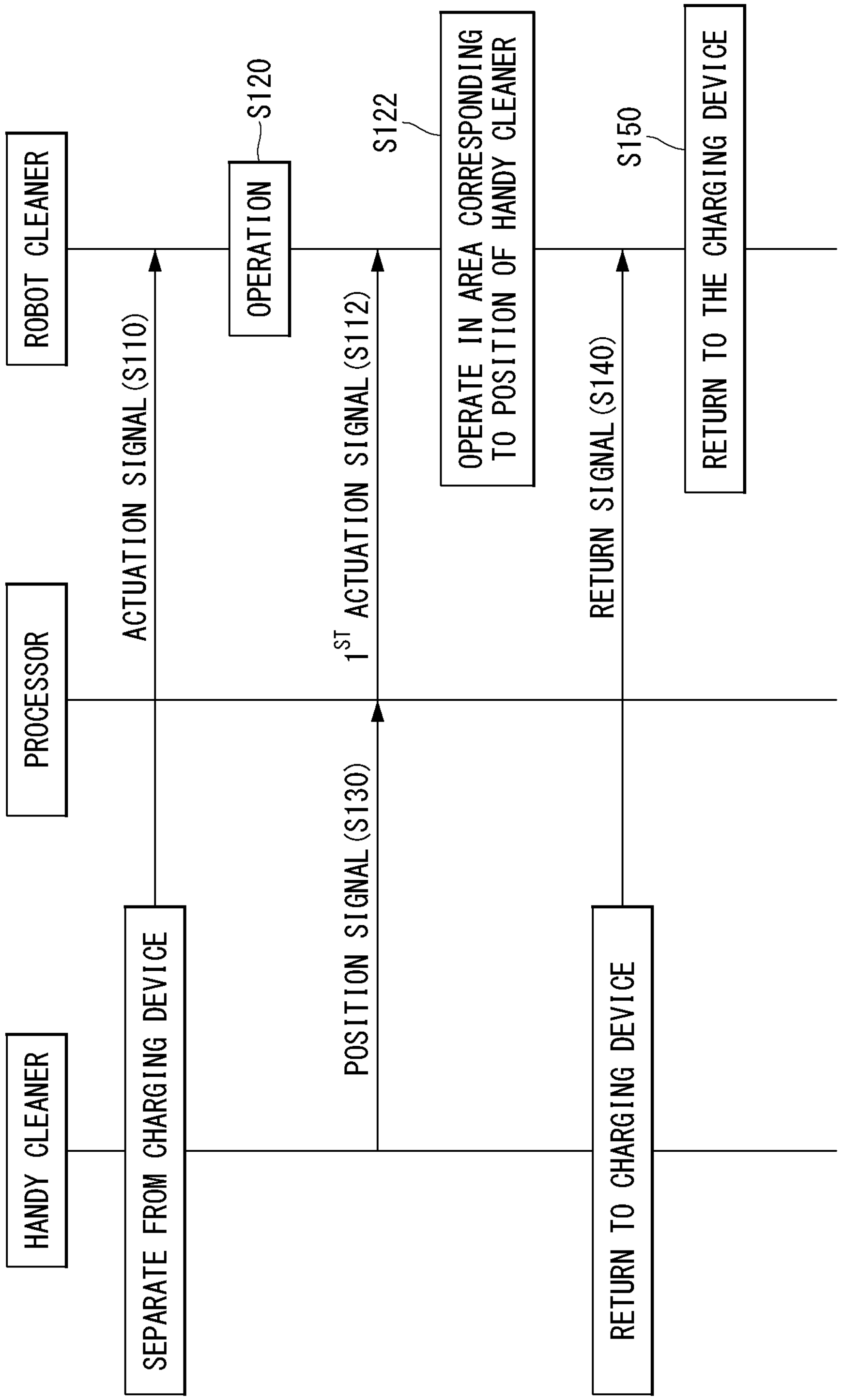
FIGS. 9 and 10 are flowcharts illustrating a control method of a robot cleaner according to an embodiment of the present discloser.
Figure 10:
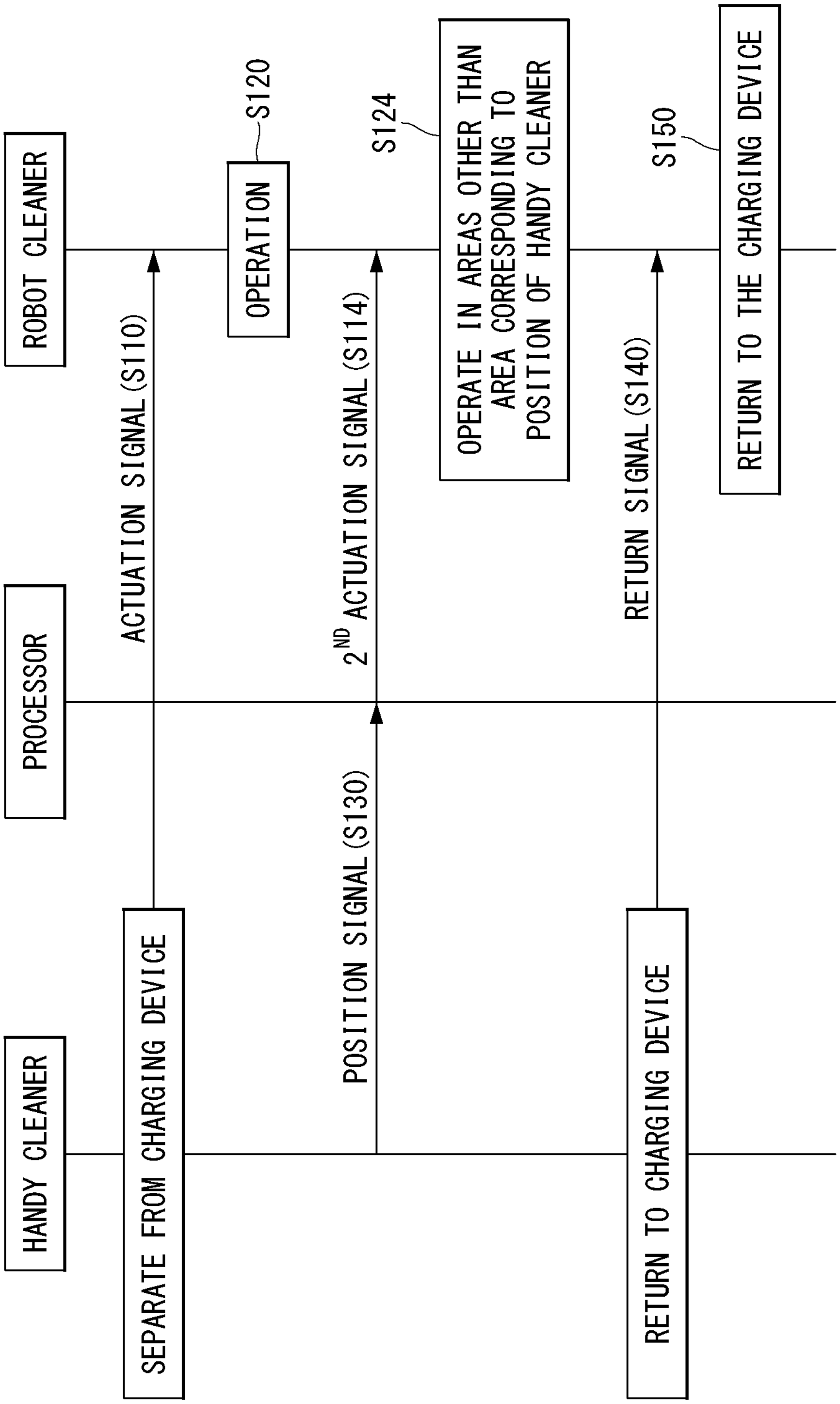
Figure 13:
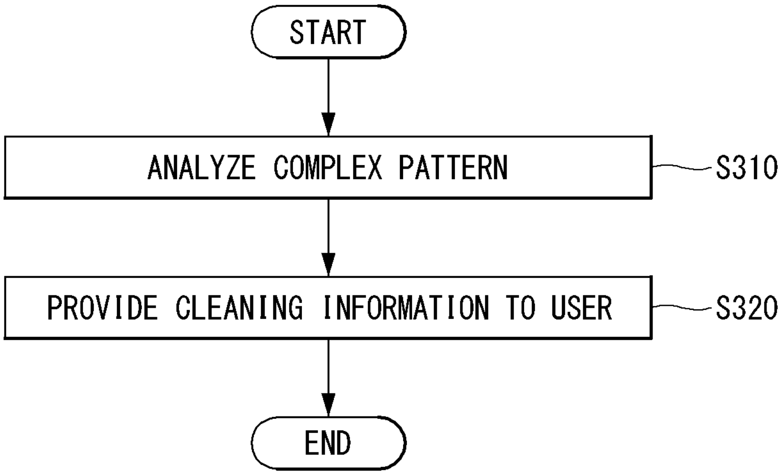
Figure 14:
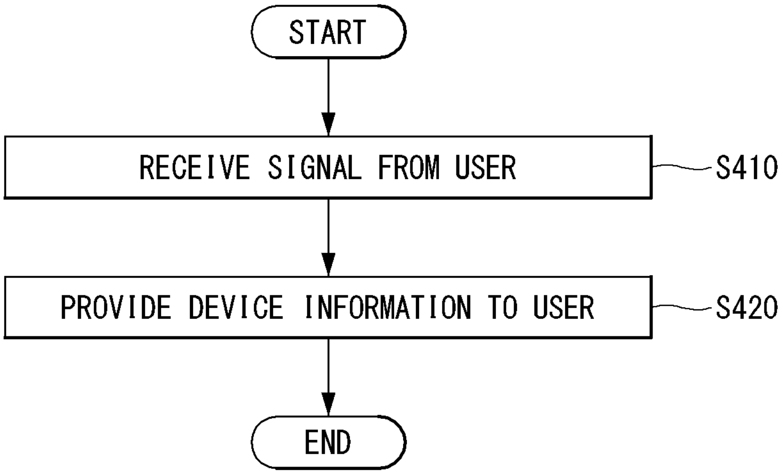
Figure 15:
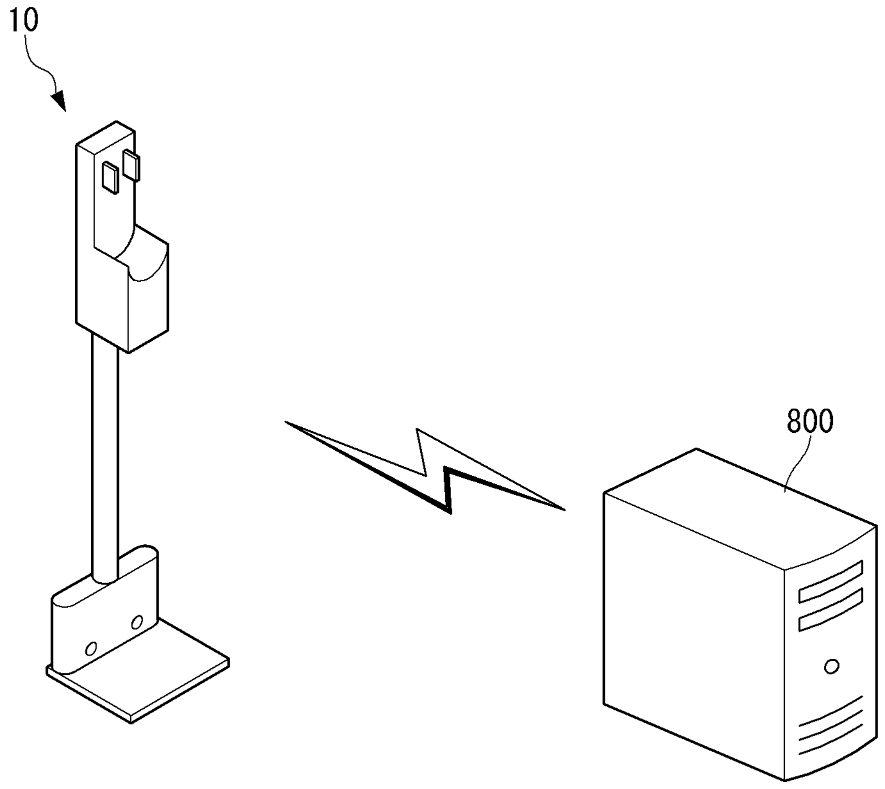
FIG. 15 is a conceptual diagram of the charging system according to the embodiment of the present discloser.

FIG. 3 is a perspective view of a charging system according to an embodiment of the present discloser. FIG. 4 is a perspective view of a charging device according to an embodiment of the present discloser. FIGS. 5 to 8 are block diagrams of the charging device according to the embodiment of the present discloser. FIGS. 9 and 10 are flowcharts illustrating a control method of a robot cleaner according to an embodiment of the present discloser. FIGS. 11 to 14 are flowcharts illustrating a control method of a charging device according to an embodiment of the present discloser. FIG. 15 is a conceptual diagram of the charging system according to the embodiment of the present discloser.

Referring to FIGS. 3 and 15, the charging system according to the embodiment of the present discloser may include a charging device 10, a handy cleaner (or manual cleaner) 20, a robot cleaner 30, and a server 800. The charging system may be implemented without some of the above components, and other additional configurations are not excluded.

A charging terminal of the handy cleaner 20 and a charging terminal of the robot cleaner 30 may be connected to the charging device 10. Thereby, a battery of the handy cleaner 20 and a battery of the robot cleaner 30 may be simultaneously charged.

The charging device 10 may be connected to a server 800 to wirelessly receive a control instruction, and then may transmit the control instruction to the handy cleaner 20 and the robot cleaner 30. Here, the charging device 10 may wirelessly receive the control instruction from a remote controller. The remote controller may include all devices capable of implementing various functions using an application program such as a cellphone (PCS phone), a smart phone, a Personal Digital Assistant (PDA), a Portable Multimedia Player (PMP), a laptop computer, a digital broadcasting terminal, a netbook, a tablet, and navigation. Furthermore, the remote controller may be a simple type of remote controller using infrared Data Association (IrDA).

The charging device 10 may transmit and receive a wireless communication signal with the server 800 and/or the robot cleaner 30 using various methods such as Radio Frequency (RF), Wireless Fidelity (Wi-Fi), Bluetooth, Zigbee, near field communication (NFC), and Ultra-Wide Band (UWB) communication.

The handy cleaner 20 may be connected to the charging device 10 to be supplied with power. The handy cleaner 20 may include a charging terminal electrically connected to a first charging terminal 110 of the charging device 10. The handy cleaner 20 may include a transceiver that transmits and receives information to and from a first transceiver 120 of the charging device 10. The handy cleaner 20 may include a rechargeable battery (not shown). The handy cleaner 20 may perform cleaning by a user's manipulation while being gripped by the user. In an embodiment of the present discloser, the handy cleaner 20 is described with a wireless handy cleaner as an example, but a wired handy cleaner is not excluded.

The robot cleaner 30 may be connected to the charging device 10 to be supplied with power. The robot cleaner 30 may include a charging terminal electrically connected to a second charging terminal 210 of the charging device 10. The robot cleaner 30 may include a transceiver that transmits and receives information to and from a second transceiver 220 of the charging device 10. The robot cleaner 30 may include a rechargeable battery (not shown).

The robot cleaner 30 may clean a set region while itself avoiding an obstruction by a set function. The robot cleaner 30 may be connected to the server 800 and clean while moving along the set region in response to a received cleaning signal. The robot cleaner 30 may include an obstruction sensor that may sense the obstruction while driving. The robot cleaner 30 may recognize its position without advance information on surrounding environment through a sensor unit, and may perform the process of localization and map-building, that is, Visual SLAM, which builds a map from the information on the environment.

The robot cleaner 30 may be directly connected to the server 800 to wirelessly receive a control instruction. Here, the robot cleaner 30 may wirelessly receive the control instruction from the remote controller. The remote controller may include all devices capable of implementing various functions using an application program such as a cellphone (PCS phone), a smart phone, a Personal Digital Assistant (PDA), a Portable Multimedia Player (PMP), a laptop computer, a digital broadcasting terminal, a netbook, a tablet, and navigation. Furthermore, the remote controller may be a simple type of remote controller using infrared Data Association (IrDA).

The robot cleaner 30 may transmit and receive a wireless communication signal with the server 800 and/or the charging device 10 using various methods such as Radio Frequency (RF), Wireless Fidelity (Wi-Fi), Bluetooth, Zigbee, near field communication (NFC), and Ultra-Wide Band (UWB) communication.

The server 800 may be connected to the charging device 10 and/or the robot cleaner 30 to communicate therewith. The server 800 may serve to receive and store information on a moving space from the robot cleaner 30. Furthermore, on the basis of the received information on the moving space, driving information on the moving space where the robot cleaner 30 moves may be generated by deep-learning. The generated information may be transmitted to the robot cleaner 30.

The server 800 may generate driving information by deep-learning using the information on the moving space received from the robot cleaner 30, and simultaneously may generate driving information by deep-learning on the basis of driving-simulation information. The more learning data is, the more accurate the deep-learning is. Thus, the server 800 may be connected to the robot cleaner 30 via a network, and may collect data required for the deep-learning.

The server 800 may include a cloud server. The cloud server means a virtual private server, and is a form of virtualization that divides one physical server into several virtual servers.

Figure 5:
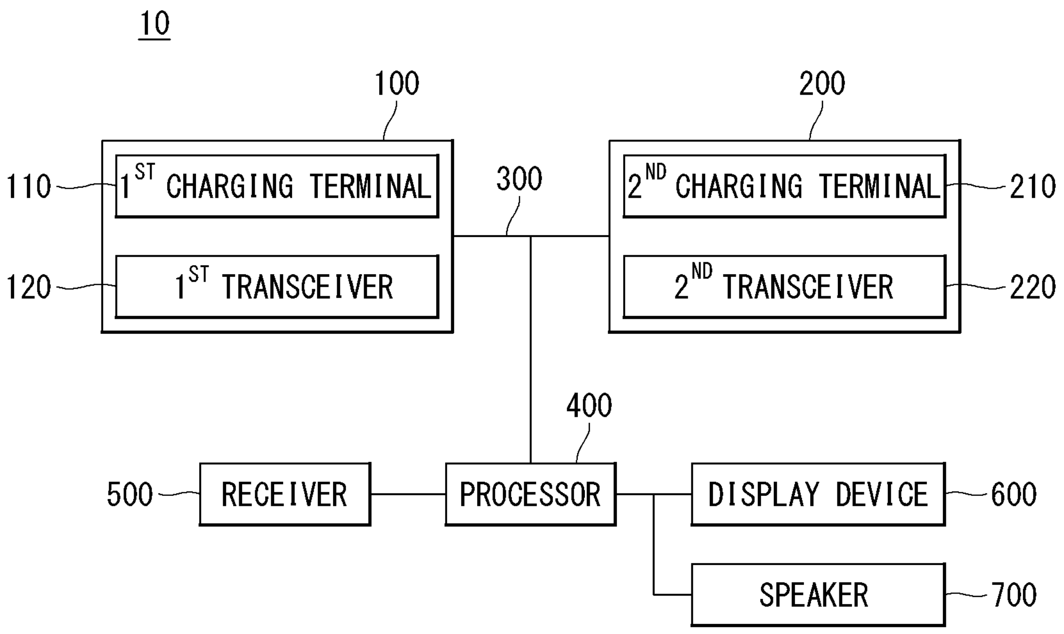
FIGS. 5 to 8 are block diagrams of the charging device according to the embodiment of the present discloser.

Referring to FIGS. 4, 5 and 15, the charging device 10 according to the embodiment of the present discloser may include a first charger 100, a second charger 200, a communication line 300, a processor 400, a receiver 500, a display device 600, and a speaker 700. The charging device may be implemented without some of the above components, and other additional configurations are not excluded.

The charging device 10 may include the first charger 100. The first charger 100 may charge the wireless handy cleaner 20. The first charger 100 may hold or support the handy cleaner 20. The first charger 100 may transmit or receive information to or from the handy cleaner 20. The first charger 100 may be formed as a member separately from the second charger 200 and then coupled thereto. Alternatively, the first charger 100 and the second charger 200 may be integrally formed. In the embodiment of the present discloser, the first charger 100 is disposed above the second charger 200. However, the arrangement of the first charger 100 and the second charger 200 may be variously changed.

The first charger 100 may include the first charging terminal 110. The first charging terminal 110 may be connected to the charging terminal of the handy cleaner 20. The first charging terminal 110 may be electrically connected to the charging terminal of the handy cleaner 20.

The first charger 100 may include the first transceiver 120. The first transceiver 120 may transmit and receive information to and from the handy cleaner 20 wirelessly and/or by wires. The first transceiver 120 may transmit and receive information to and from the transceiving unit of the handy cleaner 20 wirelessly and/or by wires. The first transceiver 120 may transmit and receive a wireless communication signal with a transceiving unit of the handy cleaner 20 using various methods such as Radio Frequency (RF), Wireless Fidelity (Wi-Fi), Bluetooth, Zigbee, near field communication (NFC), and Ultra-Wide Band (UWB) communication.

The first transceiver 120 may receive from the handy cleaner 20 information about whether the handy cleaner 20 is separated from the first charger 100 or the separated handy cleaner 20 is electrically connected to the first charger 100. The first transceiver 120 may receive the position information of the handy cleaner 20 from the handy cleaner 20. The first transceiver 120 may receive the device information of the handy cleaner 20 from the handy cleaner 20. The first transceiver 120 may receive the cleaning-pattern information of the handy cleaner 20 from the handy cleaner 20.

The first transceiver 120 may transmit information about whether the handy cleaner 20 is separated from the first charger 100 to the processor 400. The first transceiver 120 may transmit information about whether the separated handy cleaner 20 is electrically connected to the first charger 100 to the processor 400. The first transceiver 120 may transmit information about whether the separated handy cleaner 20 is held or supported on the first charger 100 to the processor 400. The first transceiver 120 may transmit the position information of the handy cleaner 20 to the processor 400. The first transceiver 120 may transmit the device information of the handy cleaner 20 to the processor 400. The first transceiver 120 may transmit the cleaning-pattern information of the handy cleaner 20 to the processor 400.

The charging device 10 may include the second charger 200. The second charger 200 may charge the wireless robot cleaner 30. The robot cleaner 30 may be docked on the second charger 200. The second charger 200 may transmit and receive information to and from the robot cleaner 30.

The second charger 200 may include the second charging terminal 210. The second charging terminal 210 may be connected to the charging terminal of the robot cleaner 30. The second charging terminal 210 may be electrically connected to the charging terminal of the robot cleaner 30.

The second charger 200 may include the second transceiver 220. The second transceiver 220 may transmit and receive information to and from the robot cleaner 30 wirelessly and/or by wires. The second transceiver 220 may transmit and receive information to and from the transceiving unit of the robot cleaner 30 wirelessly and/or by wires. The second transceiver 220 may transmit and receive a wireless communication signal with a transceiving unit of the robot cleaner 30 using various methods such as Radio Frequency (RF), Wireless Fidelity (Wi-Fi), Bluetooth, Zigbee, near field communication (NFC), and Ultra-Wide Band (UWB) communication.

The second transceiver 220 may transmit an actuation signal to the robot cleaner 30. The second transceiver 220 may transmit a return signal to the robot cleaner 30 that is being operated. The second transceiver 220 may receive the position information of the robot cleaner 30 from the robot cleaner 30. The second transceiver 220 may receive the device information on the robot cleaner 30 from the robot cleaner 30. The second transceiver 220 may receive the cleaning-pattern information of the robot cleaner 30 from the robot cleaner 30.

The second transceiver 220 may receive the actuation signal of the robot cleaner 30 from the processor 400. The second transceiver 220 may receive the return signal of the robot cleaner 30 from the processor 400. The second transceiver 220 may transmit the position information of the robot cleaner 30 to the processor 400. The second transceiver 220 may transmit the device information of the robot cleaner 30 to the processor 400. The second transceiver 220 may transmit the cleaning-pattern information of the robot cleaner 30 to the processor 400.

The charging device 10 may include the communication line 300. The communication line 300 may connect the first charger 100 and the second charger 200 to allow them to communicate with each other. The communication line 300 may electrically connect the first charger 100 to the second charger 200. The communication line 300 may connect the first transceiver 120 and the second transceiver 220 to allow them to communicate with each other. The communication line 300 may electrically connect the first transceiver 120 of the first charger 100 to the second transceiver 220 of the second charger 200. Therefore, the charging device 10 may not only charge the handy cleaner 20 and the robot cleaner 30 simultaneously but also transmit and receive information to and from the handy cleaner 20 and the robot cleaner 30. In one example, the communication line 300 may wirelessly connect the first charger 100 and the second charger 200, such as to connect the first charger 100 and the second charger 200 via Bluetooth® or other radio signals.

The communication line 300 may be electrically connected to the processor 400. The communication line 300 may be connected to the processor 400 to communicate therewith. The communication line 300 may be a general communication line including a copper wire. However, the communication line may be variously changed without being limited thereto.

The charging device 10 may include the processor 400. The processor 400 may be electrically connected to the communication line 300. The processor 400 may be connected to the communication line 300 to communicate therewith. The processor 400 may be connected via the communication line 300 to the first charger 100 and the second charger 200 to communicate therewith.

The processor 400 may receive, from the first transceiver 120, information about whether the handy cleaner 20 is separated from the first charger 100. The processor 400 may receive, from the first transceiver 120, information about whether the handy cleaner 20 is held or supported on the first charger 100. The processor 400 may receive, from the first transceiver 120, information about whether the handy cleaner 20 is electrically connected to the first charger 100. The processor 400 may receive the position information of the handy cleaner 20 from the first transceiver 120. The processor 400 may receive the device information of the handy cleaner 20 from the first transceiver 120. The processor 400 may receive the cleaning-pattern information of the handy cleaner 20 from the first transceiver 120. The processor 400 may transmit a charging instruction for the handy cleaner 20 to the first transceiver 120. In this case, the processor 400 may transmit a priority charging instruction for the handy cleaner 20 to the first transceiver 120.

The processor 400 may transmit the actuation signal of the robot cleaner 30 to the second transceiver 220. The processor 400 may transmit the return signal of the robot cleaner 30 to the second transceiver 220. The processor 400 may receive the position information of the robot cleaner 30 from the second transceiver 220. The processor 400 may receive the device information of the robot cleaner 30 from the second transceiver 220. The processor 400 may receive the cleaning-pattern information of the robot cleaner 30 from the second transceiver 220. The processor 400 may transmit the charging instruction for the robot cleaner 20 to the second transceiver 220.

The processor 400 may analyze the complex pattern (e.g., information identifying respective cleaning operations and locations where the cleaning operations are performed) of the handy cleaner 20 and the robot cleaner 30 through the cleaning pattern of the handy cleaner 20 and the cleaning pattern of the robot cleaner 30. The processor 400 may provide cleaning information to a user according to the analyzed complex pattern of the handy cleaner 20 and the robot cleaner 30. In this case, the processor 400 may provide the cleaning information to the user through the display device 600 or the speaker 700. Furthermore, the processor 400 may provide the device information to the user through the display device 600 or the speaker 700.

According to an embodiment of the present discloser, the device information may include at least one of filter-changing-cycle information of the handy cleaner 20, filter-changing-cycle information of the robot cleaner 30, remaining-battery-power information of the handy cleaner 20, remaining-battery-power information of the robot cleaner 30, dust-canister information of the handy cleaner 20, dust-canister information of the robot cleaner 30, battery-replacement-cycle information of the handy cleaner 20, and battery-replacement-cycle information of the robot cleaner 30.

According to an embodiment of the present discloser, the cleaning information may include at least one of actuation-time information of the handy cleaner 20, actuation-time information of the robot cleaner 30, information on time elapsing from a previous actuation time of the handy cleaner 20, information on time elapsing from a previous actuation time of the robot cleaner 30, information on a recently cleaned region, and information on a recently uncleaned region.

The charging device 10 may include the receiver 500. The receiver 500 may receive a signal from a user. The receiver 500 may be connected to the server 800 to communicate therewith. The receiver 500 may be connected to the remote controller to communicate therewith. The receiver 500 may transmit the signal received from the user to the processor 400. The receiver 500 may be connected to the processor 400 by wires or wirelessly. The receiver 500 may be connected to the processor 400 to communicate therewith.

The receiver 500 may include a touch screen panel (TSP) that may directly receive a signal from the user. The touch screen panel may include a display that displays information inputted by the user, a touch panel that detects a coordinate with which a part of the user's body comes into contact, and a touch screen controller that determines an instruction inputted by the user on the basis of the contact coordinate detected by the touch panel.

The receiver 500 may include an input button that may receive a signal directly from a user. The input button may adopt a push switch that senses a user's pressing, a membrane switch, or a touch switch that senses the contact of a part of the user's body.

The charging device 10 may include the display device 600. The display device 600 may be connected to the processor 400 to communicate therewith. The display device 600 may be connected to the processor 400 by wires or wirelessly. The display device 600 may visually provide the device information or the cleaning information provided from the processor 400 to the user. The display may adopt a light emitting diode (LED) emitting light by itself, an organic light emitting diode (OLED), a liquid crystal display having a separate source, and others. According to an embodiment of the present discloser, an example where the display device 600 is disposed on the charging device 10 will be described. However, the display device may be disposed on the robot cleaner 30, or may be disposed only on the robot cleaner 30 without being disposed on the charging device 10.

The charging device 10 may include the speaker 700. The speaker 700 may be connected to the processor 400 to communicate therewith. The speaker 700 may be connected to the processor 400 by wires or wirelessly. The speaker 700 may acoustically provide the device information or the cleaning information provided from the processor 400 to the user. According to an embodiment of the present discloser, an example where the speaker 700 is disposed on the charging device 10 will be described. However, the speaker may be disposed on the robot cleaner 30, or may be disposed only on the robot cleaner 30 without being disposed on the charging device 10.

Figure 6:
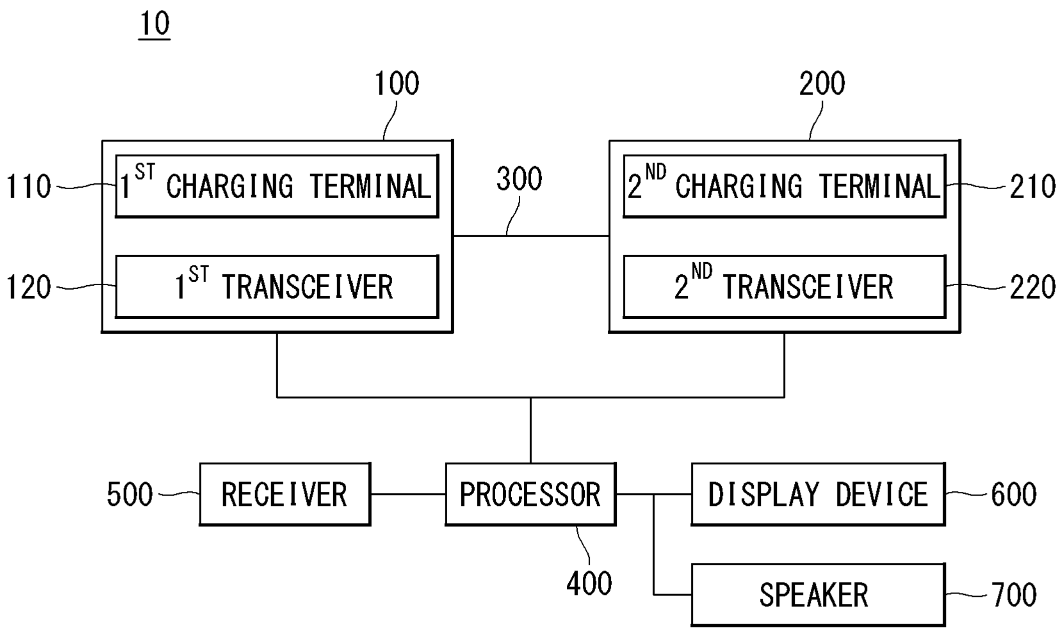

Referring to FIGS. 4, 6 and 15, a charging device 10 according to another embodiment of the present discloser may include a first charger 100, a second charger 200, a communication line 300, a processor 400, a receiver 500, a display device 600, and a speaker 700. However, the charging device may be implemented without some of the above components, and other additional configurations are not excluded.

It is to be understood that the detailed configuration of the charging device 10 according to another embodiment of the present discloser that will not be described below is the same as the detailed configuration of the charging device 10 according to the preceding embodiment of the present discloser.

Referring to FIG. 6, the communication line 300 may be connected to the first charger 100 and the second charger 200 to communicate therewith, and may not be connected to the processor 400 to communicate therewith. The communication line 300 may be electrically connected to the first charger 100 and the second charger 200, and may not be electrically connected to the processor 400.

Here, the processor 400 may be directly connected to the first charger 100 and the second charger 200 to communicate therewith. The processor 400 may be directly electrically connected to the first charger 100 and the second charger 200. The processor 400 may directly transmit and receive information to and from the first transceiver 120. The processor 400 may directly transmit and receive information to and from the second transceiver 220.

Figure 7:
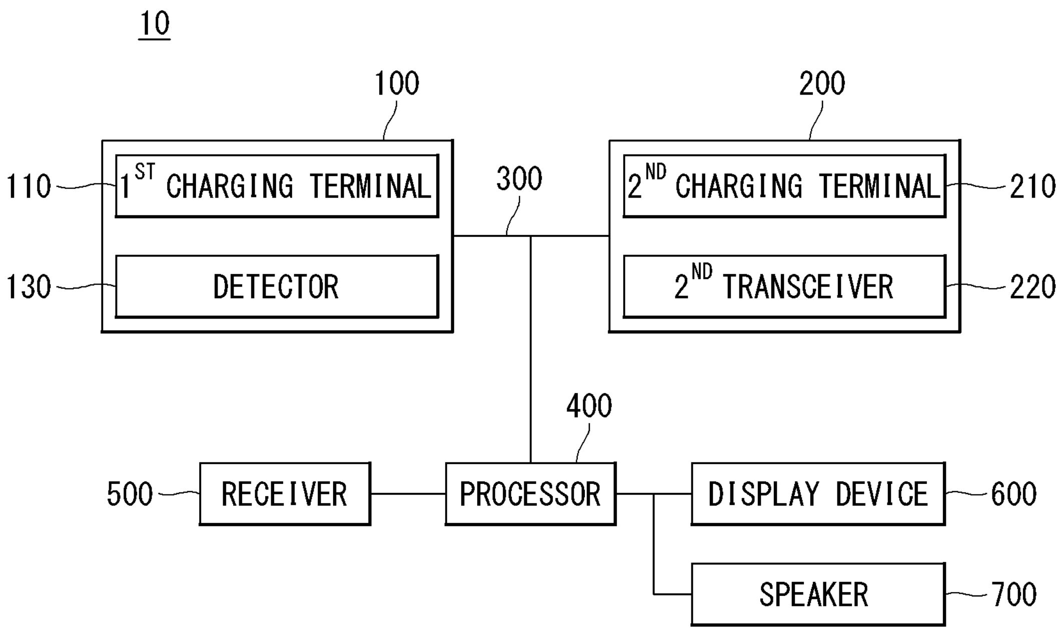

Referring to FIGS. 4, 7 and 15, a charging device 10 according to a further embodiment of the present discloser may include a first charger 100, a second charger 200, a communication line 300, a processor 400, a receiver 500, a display device 600, and a speaker 700. However, the charging device may be implemented without some of the above components, and other additional configurations are not excluded.

It is to be understood that the detailed configuration of the charging device 10 according to a further embodiment of the present discloser that will not be described below is the same as the detailed configuration of the charging device 10 according to the preceding embodiment of the present discloser.

Referring to FIG. 7, the first charger 100 may include a first charging terminal 110 and a detector (or sensor) 130. The detector 130 may detect whether the handy cleaner 20 is separated from the first charger 100. The detector 130 may detect whether the handy cleaner 20 returns to the first charger 200. The detector 130 may detect whether the handy cleaner 20 is supported or held on the first charger 200. The detector 130 may detect whether the handy cleaner 20 is electrically connected to the first charger 200.

The detector 130 may be electrically connected to the communication line 300. The detector 130 may be connected via the communication line 300 to the processor 400 to communicate therewith. The detector 130 may transmit information about whether the handy cleaner 20 is separated from the first charger 100 to the processor 400. The detector 130 may transmit information about whether the handy cleaner 20 returns to the first charger 100 to the processor 400. The detector 130 may transmit information about whether the handy cleaner 20 is held or supported on the first charger 100 to the processor 400. The detector 130 may transmit information about whether the handy cleaner 20 is electrically connected to the first charger 200 to the processor 400.

The processor 400 may be connected via the communication line 300 to the detector 130 to communicate therewith. The processor 400 may receive, from the detector 130, information whether the handy cleaner 20 is separated from the first charger 100. The processor 400 may receive, from the detector 130, information whether the handy cleaner 20 returns to the first charger 100. The processor 400 may receive, from the detector 130, information whether the handy cleaner 20 is held or supported on the first charger 100. The processor 400 may receive, from the detector 130, information whether the handy cleaner 20 is electrically connected to the first charger 200.

Figure 8:
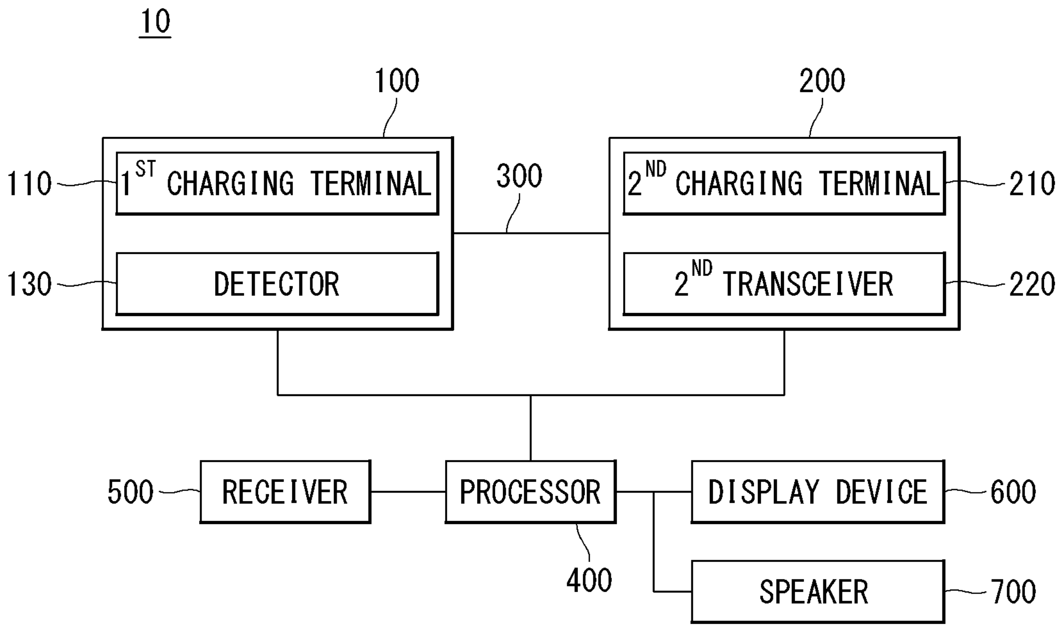

Referring to FIGS. 4, 8 and 15, a charging device 10 according to another embodiment of the present discloser may include a first charger 100, a second charger 200, a communication line 300, a processor 400, a receiver 500, a display device 600, and a speaker 700. However, the charging device may be implemented without some of the above components, and other additional configurations are not excluded.

It is to be understood that the detailed configuration of the charging device 10 according to another embodiment of the present discloser that will not be described below is the same as the detailed configuration of the charging device 10 according to the embodiment of the present discloser shown in FIG. 7.

Referring to FIG. 8, the communication line 300 may be connected to the first charger 100 and the second charger 200 to communicate therewith, and may not be connected to the processor 400 to communicate therewith. The communication line 300 may be electrically connected to the first charger 100 and the second charger 200, and may not be electrically connected to the processor 400.

Here, the processor 400 may be directly connected to the first charger 100 and the second charger 200 to communicate therewith. The processor 400 may be directly electrically connected to the first charger 100 and the second charger 200. The processor 400 may directly transmit and receive information to and from the detector 130. The processor 400 may directly transmit and receive information to and from the second transceiver 220.

A control method of the robot cleaner 30 according to an embodiment of the present discloser will be described with reference to FIG. 9. When the handy cleaner 20 is separated from the charging device 10 or the first charger 100, the processor 400 may provide an actuation signal to the robot cleaner 30 at step S110. In this case, the information about whether the handy cleaner 20 is separated from the charging device 10 or the first charger 100 may be provided through the first transceiver 120 or the detector 130 to the processor 400. Furthermore, the actuation signal for the robot cleaner 30 provided from the processor 400 may be provided through the second transceiver 220 to the robot cleaner 30.

When the actuation signal is provided to the robot cleaner 30 at step S110, the robot cleaner 30 may perform an operation at step S120. The handy cleaner 20 separated from the charging device 10 or the first charger 100 may transmit the position information of the handy cleaner 20 through the first transceiver 120 to the processor 400 at step S130.

In this case, the processor 400 may provide a first actuation signal to the robot cleaner 30 at step S112. The processor 400 may supply the first actuation signal for the robot cleaner 30 to the second transceiver 220, and the second transceiver 220 may provide the first actuation signal to the robot cleaner 30.

If the first actuation signal is provided, the robot cleaner 30 may be operated in an area corresponding to the position of the handy cleaner 30 at step S122. For example, when a user cleans with the handy cleaner 20, the robot cleaner 30 may perform cleaning while following the user. To be more specific, when foreign matter such as dust is sucked by the handy cleaner 20, the robot cleaner 30 may wipe an area where the foreign matter such as dust has been sucked by the handy cleaner 20. Thereby, cleaning efficiency can be improved and a user's convenience can be increased.

If the handy cleaner 20 returns to the charging device 10 or the first charger 100, the processor 400 may provide a return signal to the robot cleaner 30 at step S140. In this case, the robot cleaner 30 may return to the charging device 10 or the first charger 100 at step S150.

A control method of the robot cleaner 30 according to an embodiment of the present discloser will be described with reference to FIG. 10. When the handy cleaner 20 is separated from the charging device 10 or the first charger 100, the processor 400 may provide an actuation signal to the robot cleaner 30 to actuate the robot cleaner 30 at step S110. In this case, the information about whether the handy cleaner 20 is separated from the charging device 10 or the first charger 100 may be provided through the first transceiver 120 or the detector 130 to the processor 400. Furthermore, the actuation signal for the robot cleaner 30 provided from the processor 400 may be provided through the second transceiver 220 to the robot cleaner 30.

When the actuation signal is provided to the robot cleaner 30 at step S110, the robot cleaner 30 may perform an operation at step S120. The handy cleaner 20 separated from the charging device 10 or the first charger 100 may transmit the position information of the handy cleaner 20 through the first transceiver 120 to the processor 400 at step S130.

In this case, the processor 400 may provide a second actuation signal to the robot cleaner 30 at step S114. The processor 400 may supply the second actuation signal for the robot cleaner 30 to the second transceiver 220, and the second transceiver 220 may provide the second actuation signal to the robot cleaner 30.

If the second actuation signal is provided, the robot cleaner 30 may be operated in areas other than the area corresponding to the position of the handy cleaner 30 at step S124. For example, when a user cleans with the handy cleaner 20, the robot cleaner 30 may clean areas other than the area cleaned by the user. Thereby, cleaning efficiency can be improved and a user's convenience can be increased.

If the handy cleaner 20 returns to the charging device 10 or the first charger 100, the processor 400 may provide a return signal to the robot cleaner 30 at step S140. In this case, the robot cleaner 30 may return to the charging device 10 or the first charger 100 at step S150.

Figure 11:
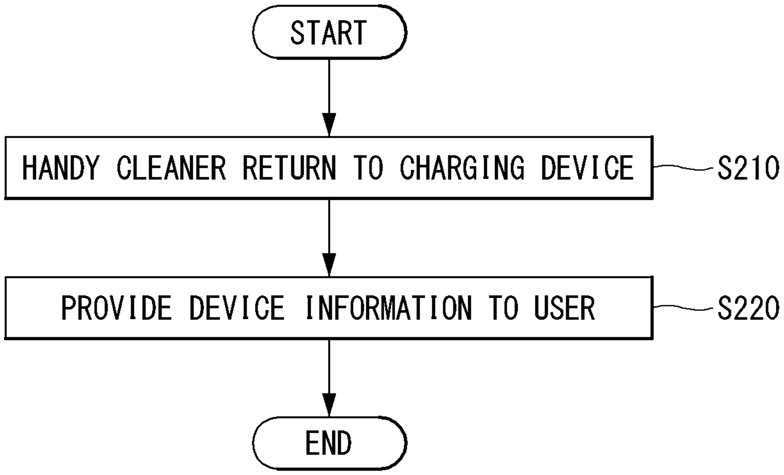
FIGS. 11 to 14 are flowcharts illustrating a control method of a charging device according to an embodiment of the present discloser.

A control method of the charging device 10 according to an embodiment of the present discloser will be described with reference to FIG. 11. When the handy cleaner 20 returns to the charging device 10 or the first charger 100 at step S210, the handy cleaner 20 may transmit the device information of the handy cleaner 20 to the processor 400. Here, the handy cleaner 20 may transmit the device information of the handy cleaner 20 through the first transceiver 120 to the processor 400.

When the handy cleaner 20 returns to the charging device 10 or the first charger 100 at step S210, the processor 400 provides the return signal to the robot cleaner 30. Meanwhile, when the robot cleaner 30 returns to an original position thereof, the robot cleaner 30 may transmit the device information of the robot cleaner 30 to the processor 400. Here, the robot cleaner 30 may transmit the device information of the robot cleaner 30 through the second transceiver 220 to the processor 400.

The processor 400 may provide the device information of the handy cleaner 20 and/or the device information of the robot cleaner 30 to a user at step S220. Here, the device information of the handy cleaner 20 and/or the device information of the robot cleaner 30 may be provided through the display device 600 and/or the speaker 700 to the user.

Figure 12:
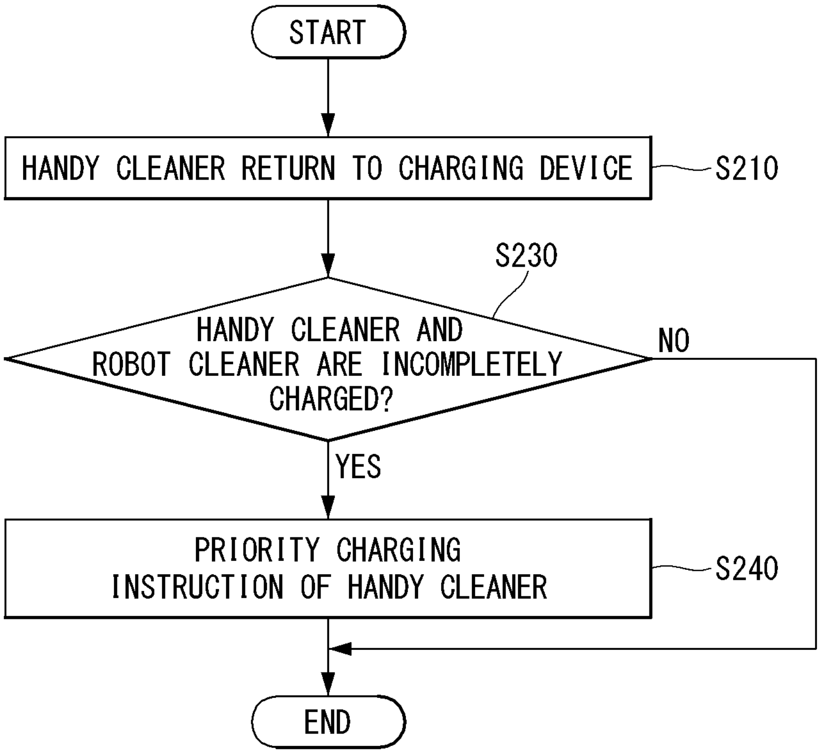

A control method of the charging device 10 according to an embodiment of the present discloser will be described with reference to FIG. 12. When the handy cleaner 20 returns to the charging device 10 or the first charger 100 at step S210, the processor 400 may determine whether the handy cleaner 20 and the robot cleaner 30 are incompletely charged at step S230.

When both the handy cleaner 20 and the robot cleaner 30 are incompletely charged, the processor 400 may provide the priority charging instruction of the handy cleaner 20 to the first charger 100 at step S240. To be more specific, the processor 400 may preferentially set the charging of the handy cleaner 20 prior to the robot cleaner 30. Therefore, since the battery of the handy cleaner 20 that is directly gripped by a user when in use is preferentially charged, the user's convenience can be improved.

If the handy cleaner 20 is completely charged and the robot cleaner 30 is incompletely charged, the processor 400 may perform only the charging of the robot cleaner 30. If the handy cleaner 20 is incompletely charged and the robot cleaner 30 is completely charged, the processor 400 may perform only the charging of the handy cleaner 20.

A control method of the charging device 10 according to an embodiment of the present discloser will be described with reference to FIG. 13. The processor 400 may analyze the complex pattern of the handy cleaner 20 and the robot cleaner 30 through the cleaning information of the handy cleaner 20 and the cleaning information of the robot cleaner 30 at step S310. The processor 400 may receive the cleaning information of the handy cleaner 20 from the handy cleaner 20. The processor 400 may receive the cleaning information of the handy cleaner 20 through the first transceiver 120 from the handy cleaner 20. The processor 400 may receive the cleaning information of the robot cleaner 30 from the robot cleaner 30. The processor 400 may receive the cleaning information of the robot cleaner 30 through the second transceiver 220 from the robot cleaner 30.

The processor 400 may provide the cleaning information to the user according to the analyzed complex pattern at step S320. The processor 400 may provide the cleaning information to the user through the display device 600 and/or the speaker 700.

A control method of the charging device 10 according to an embodiment of the present discloser will be described with reference to FIG. 14. If the signal is received from the user at step S410, the processor 400 may provide the device information of the handy cleaner 20 and/or the robot cleaner 30 to the user at step S420. In this case, the signal from the user may be provided through the receiver 500. Further, the device information of the handy cleaner 20 and/or the robot cleaner 30 may be provided through the display device 600 and/or the speaker 700. Therefore, since the device information of the handy cleaner 20 and/or the robot cleaner 30 may be provided if desired, the user's convenience can be increased.

The present discloser provides a charging device that cannot only charge a handy cleaner and a robot cleaner simultaneously but also can transmit and receive information from and to the handy cleaner and the robot cleaner. In an aspect, a charging device for charging a wireless handy cleaner and a robot cleaner may include a first charger including a first charging terminal connected to a charging terminal of the handy cleaner, and a first transceiver configured to transmit and receive information to and from the handy cleaner; a second charger including a second charging terminal connected to a charging terminal of the robot cleaner, and a second transceiver configured to transmit and receive information to and from the robot cleaner; and a communication line configured to electrically connect the first transceiver and the second transceiver to each other.

Therefore, the charging device cannot only charge the handy cleaner and the robot cleaner simultaneously but also can provide information to the handy cleaner and the robot cleaner. The charging device may include a processor connected electrically to the communication line, wherein the processor may supply an actuation signal to the second transceiver so as to actuate the robot cleaner, when the handy cleaner is separated from the first charger.

The first transceiver may receive position information from the handy cleaner, when the handy cleaner is separated from the first charger, the processor may supply a first actuation signal to the second transceiver, and the first actuation signal may cause the robot cleaner to be actuated in an area corresponding to the position information.

The first transceiver may receive position information from the handy cleaner, when the handy cleaner is separated from the first charger, the processor may supply a second actuation signal to the second transceiver, and the second actuation signal may cause the robot cleaner to be actuated in areas other than the area corresponding to the position information.

The processor may supply a return signal to the second transceiver so as to return the robot cleaner to an original position thereof, when the charging terminal of the handy cleaner and the first charging terminal are electrically connected to each other.

The processor may provide device information to a user, when the charging terminal of the handy cleaner and the first charging terminal are electrically connected to each other, and the device information may include at least one of filter-changing-cycle information of the handy cleaner, filter-changing-cycle information of the robot cleaner, remaining-battery-power information of the handy cleaner, remaining-battery-power information of the robot cleaner, dust-canister information of the handy cleaner, dust-canister information of the robot cleaner, battery-replacement-cycle information of the handy cleaner, and battery-replacement-cycle information of the robot cleaner.

The charging device may include a processor connected electrically to the first and second chargers, wherein the processor may preferentially set charging of the handy cleaner prior to the robot cleaner, when the handy cleaner and the robot cleaner are incompletely charged.

The charging device may include a processor connected electrically to the communication line, wherein the processor may analyze a complex pattern of the handy cleaner and the robot cleaner, and provide cleaning information to a user according to the analyzed complex pattern.

The cleaning information may include at least one of actuation-time information of the handy cleaner, actuation-time information of the robot cleaner, information on time elapsing from a previous actuation time of the handy cleaner, information on time elapsing from a previous actuation time of the robot cleaner, information on a recently cleaned region, and information on a recently uncleaned region.

The charging device may include a receiver configured to receive a signal from a user; and a processor configured to provide device information to the user in the case of receiving the signal from the user, wherein the device information may include at least one of filter-changing-cycle information of the handy cleaner, filter-changing-cycle information of the robot cleaner, remaining-battery-power information of the handy cleaner, remaining-battery-power information of the robot cleaner, dust-canister information of the handy cleaner, dust-canister information of the robot cleaner, battery-replacement-cycle information of the handy cleaner, and battery-replacement-cycle information of the robot cleaner.

The charging device may include a display device configured to display the device information. The charging device may include a speaker configured to instruct the device information by voice.

In an aspect, a charging device for charging a wireless handy cleaner and a robot cleaner may include a first charger including a first charging terminal connected to a charging terminal of the handy cleaner, and a detector configured to detect an electric connection between the handy cleaner and the first charging terminal; a second charger including a second charging terminal connected to a charging terminal of the robot cleaner, and a second transceiver configured to transmit and receive information to and from the robot cleaner; and a communication line configured to electrically connect the first charger and the second transceiver to each other.

Therefore, the charging device cannot only charge the handy cleaner and the robot cleaner simultaneously but also can provide information to the handy cleaner and the robot cleaner. The charging device may include a processor connected electrically to the communication line, wherein the processor may supply an actuation signal to the second transceiver so as to actuate the robot cleaner, when the handy cleaner is separated from the first charger.

The processor may supply a return signal to the second transceiver so as to return the robot cleaner to an original position thereof, when the charging terminal of the handy cleaner and the first charging terminal are electrically connected to each other.

The processor may provide device information to a user, when the charging terminal of the handy cleaner and the first charging terminal are electrically connected to each other, and the device information may include at least one of filter-changing-cycle information of the handy cleaner, filter-changing-cycle information of the robot cleaner, remaining-battery-power information of the handy cleaner, remaining-battery-power information of the robot cleaner, dust-canister information of the handy cleaner, dust-canister information of the robot cleaner, battery-replacement-cycle information of the handy cleaner, and battery-replacement-cycle information of the robot cleaner.

The charging device may include a processor connected electrically to the first and second chargers, wherein the processor may preferentially set charging of the handy cleaner prior to the robot cleaner, when the handy cleaner and the robot cleaner are incompletely charged. The charging device may include a processor connected electrically to the communication line, wherein the processor may analyze a complex pattern of the handy cleaner and the robot cleaner, and provide cleaning information to a user according to the analyzed complex pattern.

The cleaning information may include at least one of actuation-time information of the handy cleaner, actuation-time information of the robot cleaner, information on time elapsing from a previous actuation time of the handy cleaner, information on time elapsing from a previous actuation time of the robot cleaner, information on a recently cleaned region, and information on a recently uncleaned region.

The charging device may include a receiver configured to receive a signal from a user; and a processor configured to provide device information to the user in the case of receiving the signal from the user, wherein the device information may include at least one of filter-changing-cycle information of the handy cleaner, filter-changing-cycle information of the robot cleaner, remaining-battery-power information of the handy cleaner, remaining-battery-power information of the robot cleaner, dust-canister information of the handy cleaner, dust-canister information of the robot cleaner, battery-replacement-cycle information of the handy cleaner, and battery-replacement-cycle information of the robot cleaner.

The present discloser can provide a charging device that can charge a handy cleaner and a robot cleaner simultaneously and also can transmit and receive information to and from the handy cleaner and the robot cleaner.

In certain implementations, a charging device for charging a manual cleaner and a robot cleaner comprises: a first charger comprising a first charging terminal configured to charge the manual cleaner when the manual cleaner is coupled to the charging device, and a first transceiver configured to exchange information with the manual cleaner; a second charger comprising a second charging terminal configured to charge the robot cleaner when the robot cleaner is coupled to the charging device, and a second transceiver configured to exchange information with the robot cleaner; and a communication line configured to connect the first transceiver and the second transceiver.

The charging device may further comprise: a processor, wherein the processor manages the second transceiver to supply an actuation signal to actuate the robot cleaner when the manual cleaner is separated from the first charger. The first transceiver may receive position information from the manual cleaner when the manual cleaner is separated from the first charger, and the actuation signal may cause the robot cleaner to be actuated in an area corresponding to the position information from the manual cleaner.

The first transceiver may receive position information from the manual cleaner when the manual cleaner is separated from the first charger, and the actuation signal may cause the robot cleaner to be actuated in a first area that differs from a second area corresponding to the position information from the manual cleaner. The processor may manage the second transceiver to supply a return signal that causes the robot cleaner to return to the charging device when the first charging terminal is charging the manual cleaner.

The charging device may further comprise: a processor that provides device information to a user when the first charging terminal is charging the manual cleaner, wherein the device information includes at least one of: filter-changing-cycle information of the manual cleaner, filter-changing-cycle information of the robot cleaner, remaining-battery-power information of the manual cleaner, remaining-battery-power information of the robot cleaner, dust-canister information of the manual cleaner, dust-canister information of the robot cleaner, battery-replacement-cycle information of the manual cleaner, or battery-replacement-cycle information of the robot cleaner.

The charging device may further comprise: a processor, wherein the processor manages the first charger and the second charger such that the first charging terminal charges the manual cleaner before the second charging terminal charges the robot cleaner, when the manual cleaner and the robot cleaner are coupled to the charging device and are incompletely charged.

The charging device may further comprise: a processor, wherein the processor analyzes location and cleaning function information of the manual cleaner and the robot cleaner, and provides cleaning information to a user according to the analyzed location and cleaning function information. The cleaning information may include at least one of: actuation-time information of the manual cleaner, actuation-time information of the robot cleaner, information on time elapsing from a previous actuation time of the manual cleaner, information on time elapsing from a previous actuation time of the robot cleaner, information on a region cleaned during a first time period, or information on a region that is not cleaned during a second time period.

The charging device may further comprise: a receiver configured to receive a signal from a user; and a processor configured to provide device information to the user based on the signal from the user, wherein the device information may include at least one of: filter-changing-cycle information of the manual cleaner, filter-changing-cycle information of the robot cleaner, remaining-battery-power information of the manual cleaner, remaining-battery-power information of the robot cleaner, dust-canister information of the manual cleaner, dust-canister information of the robot cleaner, battery-replacement-cycle information of the manual cleaner, or battery-replacement-cycle information of the robot cleaner.

The charging device may further comprise a display configured to output visual content associated with the device information. The charging device may further comprise a speaker configured to output audio content associated with the device information.

In certain implementations, a charging device for charging a manual cleaner and a robot cleaner may comprise: a first charger comprising a first charging terminal configured to charge the manual cleaner when the manual cleaner is coupled to the charging device, and a sensor configured to detect an electrical connection between the manual cleaner and the first charging terminal; a second charger comprising a second charging terminal configured to charge the robot cleaner when the robot cleaner is coupled to the charging device, and a transceiver configured to exchange information with the robot cleaner; and a communication line configured to connect the first charger and the second charger.

The charging device may further comprise: a processor, wherein the processor manages the transceiver to output an actuation signal to actuate the robot cleaner when detector of the first charger senses that the manual cleaner is separated from the first charger. The processor may manage the transceiver to output a return signal cause the robot cleaner return to the charging device when the detector senses the electrical connection between the manual cleaner and the first charging terminal.

The processor may provide device information to a user, when the manual cleaner and the first charging terminal are electrically connected to each other, and the device information includes at least one of: filter-changing-cycle information of the manual cleaner, filter-changing-cycle information of the robot cleaner, remaining-battery-power information of the manual cleaner, remaining-battery-power information of the robot cleaner, dust-canister information of the manual cleaner, dust-canister information of the robot cleaner, battery-replacement-cycle information of the manual cleaner, or battery-replacement-cycle information of the robot cleaner.

The charging device may further comprise: a processor, wherein the processor manages the first charger and the second charger such that the first charging terminal charges the manual cleaner before the second charging terminal charges the robot cleaner, when the manual cleaner and the robot cleaner are coupled to the charging device and are incompletely charged.

The charging device may further comprise: a processor, wherein the processor analyzes location and cleaning function information of the manual cleaner and the robot cleaner, and provides cleaning information to a user according to the analyzed location and cleaning function information. The cleaning information may include at least one of: actuation-time information of the manual cleaner, actuation-time information of the robot cleaner, information on time elapsing from a previous actuation time of the manual cleaner, information on time elapsing from a previous actuation time of the robot cleaner, information on a region cleaned during a first time period, or information on a region that is not cleaned during a second time period.

The charging device may further comprise: a receiver configured to receive a signal from a user; and a processor configured to provide device information to the user based on the signal from the user, wherein the device information includes at least one of: filter-changing-cycle information of the manual cleaner, filter-changing-cycle information of the robot cleaner, remaining-battery-power information of the manual cleaner, remaining-battery-power information of the robot cleaner, dust-canister information of the manual cleaner, dust-canister information of the robot cleaner, battery-replacement-cycle information of the manual cleaner, or battery-replacement-cycle information of the robot cleaner.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A charging device for charging a manual cleaner and a robot cleaner, the charging device comprising:

a first charger comprising a first charging terminal configured to charge the manual cleaner when the manual cleaner is coupled to the charging device, and a first transceiver configured to exchange information with the manual cleaner;

a second charger comprising a second charging terminal configured to charge the robot cleaner when the robot cleaner is coupled to the charging device, and a second transceiver configured to exchange information with the robot cleaner; and a communication line configured to connect the first transceiver and the second transceiver.

2. The charging device of claim 1, further comprising:

a processor, wherein the processor manages the second transceiver to supply an actuation signal to actuate the robot cleaner when the manual cleaner is separated from the first charger.

3. The charging device of claim 2, wherein the first transceiver receives position information from the manual cleaner when the manual cleaner is separated from the first charger, and the actuation signal causes the robot cleaner to be actuated in an area corresponding to the position information from the manual cleaner.

4. The charging device of claim 2, wherein the first transceiver receives position information from the manual cleaner when the manual cleaner is separated from the first charger, and the actuation signal causes the robot cleaner to be actuated in a first area that differs from a second area corresponding to the position information from the manual cleaner.

5. The charging device of claim 2, wherein the processor manages the second transceiver to supply a return signal that causes the robot cleaner to return to the charging device when the first charging terminal is charging the manual cleaner.

6. The charging device of claim 1, further comprising:

a processor that provides device information to a user when the first charging terminal is charging the manual cleaner, wherein the device information includes at least one of:

filter-changing-cycle information of the manual cleaner, filter-changing-cycle information of the robot cleaner, remaining-battery-power information of the manual cleaner, remaining-battery-power information of the robot cleaner, dust-canister information of the manual cleaner, dust-canister information of the robot cleaner, battery-replacement-cycle information of the manual cleaner, or battery-replacement-cycle information of the robot cleaner.

7. The charging device of claim 1, further comprising:

a processor, wherein the processor manages the first charger and the second charger such that the first charging terminal charges the manual cleaner before the second charging terminal charges the robot cleaner, when the manual cleaner and the robot cleaner are coupled to the charging device and are incompletely charged.

8. The charging device of claim 1, further comprising:

a processor, wherein the processor analyzes location and cleaning function information of the manual cleaner and the robot cleaner, and provides cleaning information to a user according to the analyzed location and cleaning function information.

9. The charging device of claim 8, wherein the cleaning information includes at least one of:

actuation-time information of the manual cleaner, actuation-time information of the robot cleaner, information on time elapsing from a previous actuation time of the manual cleaner, information on time elapsing from a previous actuation time of the robot cleaner, information on a region cleaned during a first time period, or information on a region that is not cleaned during a second time period.

10. The charging device of claim 1, further comprising:

a receiver configured to receive a signal from a user; and a processor configured to provide device information to the user based on the signal from the user, wherein the device information includes at least one of:

filter-changing-cycle information of the manual cleaner, filter-changing-cycle information of the robot cleaner, remaining-battery-power information of the manual cleaner, remaining-battery-power information of the robot cleaner, dust-canister information of the manual cleaner, dust-canister information of the robot cleaner, battery-replacement-cycle information of the manual cleaner, or battery-replacement-cycle information of the robot cleaner.

11. The charging device of claim 10, further comprising:

a display configured to output visual content associated with the device information.

12. The charging device of claim 10, further comprising:

a speaker configured to output audio content associated with the device information.

13. A charging device for charging a manual cleaner and a robot cleaner, the charging device comprising:

a first charger comprising a first charging terminal configured to charge the manual cleaner when the manual cleaner is coupled to the charging device, and a sensor configured to detect an electrical connection between the manual cleaner and the first charging terminal;

a second charger comprising a second charging terminal configured to charge the robot cleaner when the robot cleaner is coupled to the charging device, and a transceiver configured to exchange information with the robot cleaner; and a communication line configured to connect the first charger and the transceiver.

14. The charging device of claim 13, further comprising:

a processor, wherein the processor manages the transceiver to output an actuation signal to actuate the robot cleaner when the sensor of the first charger detects that the manual cleaner is separated from the first charger.

15. The charging device of claim 14, wherein the processor manages the transceiver to output a return signal that causes the robot cleaner return to the charging device when the detector senses the electrical connection between the manual cleaner and the first charging terminal.

16. The charging device of claim 14, wherein the processor provides device information to a user, when the manual cleaner and the first charging terminal are electrically connected to each other, and the device information includes at least one of:

filter-changing-cycle information of the manual cleaner, filter-changing-cycle information of the robot cleaner, remaining-battery-power information of the manual cleaner, remaining-battery-power information of the robot cleaner, dust-canister information of the manual cleaner, dust-canister information of the robot cleaner, battery-replacement-cycle information of the manual cleaner, or battery-replacement-cycle information of the robot cleaner.

17. The charging device of claim 13, further comprising:

a processor, wherein the processor manages the first charger and the second charger such that the first charging terminal charges the manual cleaner before the second charging terminal charges the robot cleaner, when the manual cleaner and the robot cleaner are coupled to the charging device and are incompletely charged.

18. The charging device of claim 13, further comprising:

a processor, wherein the processor analyzes location and cleaning function information of the manual cleaner and the robot cleaner, and provides cleaning information to a user according to the analyzed location and cleaning function information.

19. The charging device of claim 18, wherein the cleaning information includes at least one of:

actuation-time information of the manual cleaner, actuation-time information of the robot cleaner, information on time elapsing from a previous actuation time of the manual cleaner, information on time elapsing from a previous actuation time of the robot cleaner, information on a region cleaned during a first time period, or information on a region that is not cleaned during a second time period.

20. The charging device of claim 13, further comprising:

a receiver configured to receive a signal from a user; and a processor configured to provide device information to the user based on the signal from the user, wherein the device information includes at least one of:

filter-changing-cycle information of the manual cleaner, filter-changing-cycle information of the robot cleaner, remaining-battery-power information of the manual cleaner, remaining-battery-power information of the robot cleaner, dust-canister information of the manual cleaner, dust-canister information of the robot cleaner, battery-replacement-cycle information of the manual cleaner, or battery-replacement-cycle information of the robot cleaner.

* * * * *